Figure 1:
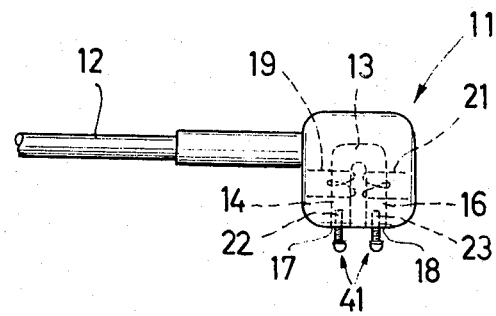

United States Patent [19]

Streng

[11] 3,999,120
[45] Dec. 21, 1976

[54] SPHERICAL SECTOR FOR SENSOR PROBE

[76] Inventor: Ludwig Streng, Falkenstrasse 9, 7036 Schonaich, Germany

[22] Filed: Oct. 4, 1974

[21] Appl. No.: 512,101

[30] Foreign Application Priority Data

Oct. 12, 1973 Germany .......................... 7337864

[52] U.S. Cl. ............................................ 324/34 TK
[51] Int. Cl.² ...................................... G01R 33/12
[58] Field of Search ............. 324/34 TK, 34 R, 40; 427/249

[56] References Cited

UNITED STATES PATENTS

| 2,365,592 | 12/1944 | Reason | 324/34 TK |
| 2,872,350 | 2/1959 | Homer et al. | 427/249 |
| 2,903,645 | 8/1959 | Wright et al. | 324/34 TK |
| 3,260,927 | 7/1966 | Young | 324/34 TK |
| 3,440,527 | 4/1969 | Steingroever | 324/34 TK |

FOREIGN PATENTS OR APPLICATIONS 529,107  11/1940  United Kingdom ............... 317/201

Primary Examiner—R. V. Rolinec
Assistant Examiner—Ernest F. Karlsen

[57] ABSTRACT

A spherical sector is fastened to the front faces of a soft-iron magnetic yoke of the magnet of a sensor probe used for thickness measurement. The spherical sector, which is the probe tip, is a ground half ball-bearing electrically welded to a flat plate at the end of a threaded shaft. A titanium carbide layer of spherical angle of approximately 60° is deposited on the wear side of the spherical sector by gaseous diffusion in a range of approximately 4 – 6 $\mu$ in which the deviation of the layer thickness from the mean value is within 1 $\mu$.

5 Claims, 5 Drawing Figures

SPHERICAL SECTOR FOR SENSOR PROBE

The subject invention is a spherical sector for fastening to the front faces of a soft-iron magnetic yoke of a magnet of a sensor probe, which sensor probe is used for measuring the thickness of thin non-ferromagnetic layers on a ferromagnetic base, where the spherical is a ground ball-bearing ball.

An earlier proposal uses as spherical sectors ball-bearing balls which have been ground with a plane base. The ground surface is self-substance bonded to the top side of screw heads and these screws are screwed into blind bores in the yoke of a magnet.

Ball-bearing balls constitute a highly accurate and, because of their mass production, relatively simple component. However, their surface is not sufficiently wearproof. This means that in the course of time no genuine spherical surface remains and the magnetic resistance varies, depending on the angle at which the sensor probe is placed on the workpiece to be tested.

These disadvantages of the earlier proposal are ameliorated by making the probe tips replaceable. However, because the probe tips are very small, one cannot tighten them by hand or loosen them for replacement by hand. Rather, a special set of pliers is required.

Finally, it may happen that one may mistake used probe tips for fresh ones, because it is very difficult to determine whether a wear, e.g., by 3 $\mu$ has taken place or not.

All these items impair the measuring accuracy.

The purpose of this invention is to find spherical sectors which are just as highly accurate as the known spherical sectors, whose accuracy to size over time is so great that the lifetime of the probe tips is equal to the lifetime of the sensor probe and which, in spite of all these advantages, are inexpensive in comparison to the probe tips previously proposed.

In this invention, this problem is solved by the following characteristics:

a. Inside a spherical angle, a layer made of a hard, wearproof carbide which cannot be dissociated by water and thinned acids is placed on that side of the spherical sector which is exposed to wear.

b. The layer thickness within this solid angle deviates within 1 $\mu$.

Other advantages and characteristics of the invention are evident from the following description of a preferred form of construction.

In the drawings

Figure 2:
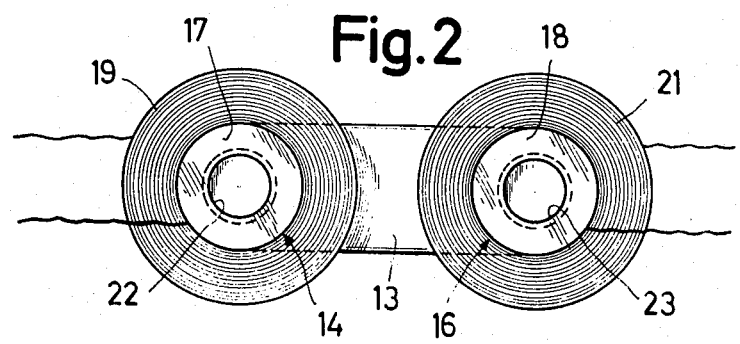
Figure 3:
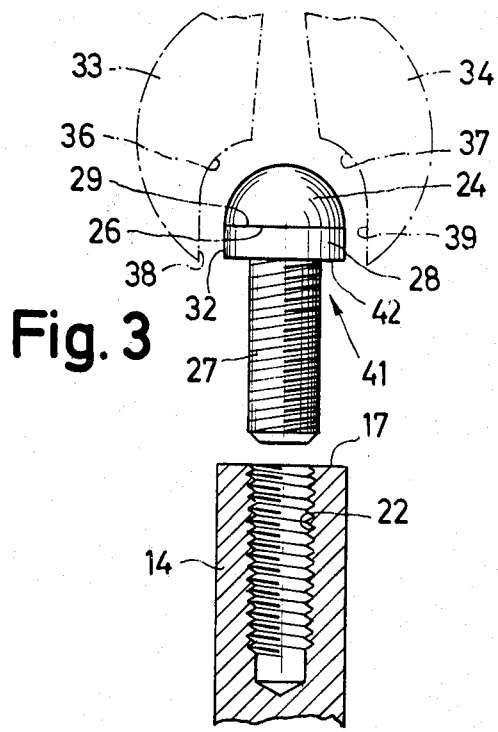
Figure 4:
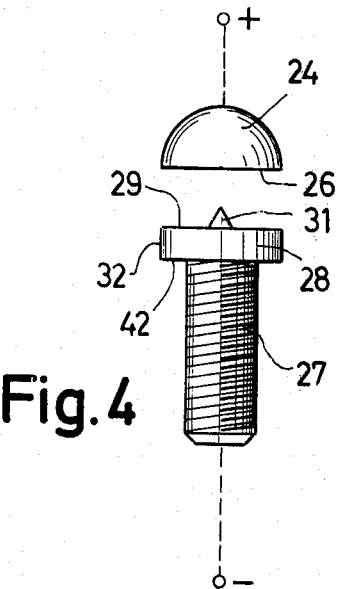
Figure 5:
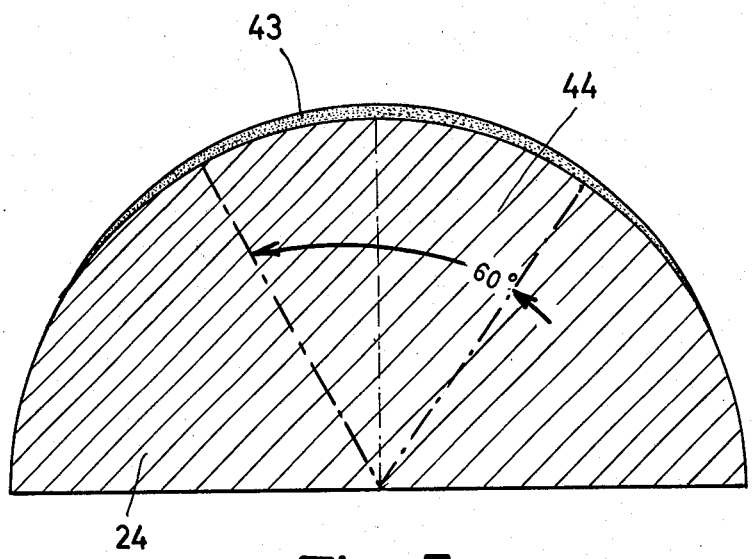

FIG. 1 shows the sideview of a sensor probe with the probe pin not screwed in all the way, FIG. 2 shows the topview onto the front face of a U magnetic core with winding, without probe tips, FIG. 3 shows an enlarged picture of a finished probe tip, just before inserting the screw thread, FIG. 4 shows a two-part probe tip before its final position, FIG. 5 a further enlarged sectional view through a hemisphere.

A lead-in cable 12 enters a sensor probe 11. FIG. 1 shows the sensor probe in its actual size. A U magnetic core 13 is cast into it. This core has two parallel legs 14, 16, whose front faces 17, 18 are visible from the outside, and are not covered with cast material. Leg 14 mounts an excitation coil 19, while leg 16 mounts an induction coil 21, whose ends are lead out through lead-in cable 12. In each leg 14, 16, a blind threaded bore 22, 23 is introduced from the front face 17, 18. These bores are only 4 mm long.

The front face 17, 18 is plane.

From a ball bearing ball of about 2 mm diameter, half is ground off, so that there remains a hemisphere 24 whose ground surface 26 must be a plane surface. Such ball bearing balls constitute ferromagnetic bodies which are very wear resistant and have a very exact spherical geometry. Their outer surface is harder than the tougher core.

A threaded shaft 27 of a few millimeters length mounts a circular disk shaped plate 28. On the top side 29 of plate 28, a small cone 31 is located. In order to connect the two parts with one another, the threaded shaft 27 is connected to a negative potential and the hemisphere 24 is connected to a positive potential of sufficient magnitude, in accordance with electric welding practice. If the hemisphere 24 is pressed onto the top side 29, the little cone 31 is welded onto hemisphere 24. Hemisphere 24 is pressed against plate 28 till there is practically no longer a gap between the ground surface 26 and top side 29. During this process, only the core of hemisphere 24 is heated appreciably and the heat generation is restricted to a very small area. Nevertheless, the joint between the hemisphere 24 and plate 28 is excellent, both magnetically and mechanically. In the outer skin of hemisphere 24, no damaging recrystalization takes place.

The hemisphere 24 could also be attached with hard solder. However, this would require solder, the process would be more complicated and one would have difficulties restricting the solder flow to limited areas, and the hardness of the spherical surface would be impaired by the soldering process.

Now there has developed an object which, in spite of its smallness, can easily be grasped with a pair of pliers, because plate 28 with its edge 32 constitutes a wide band. The pliers have two jaws 33, 34 similar to a sidecutter, a combination pliers or such. Each jaw 33, 34 has a recess 36, 37 permitting sufficient room for hemisphere 24. However, outer edge 38, 39 extends to the region of edge 32 of plate 28 and hence can grasp the probe tip 41 without pressing in any manner on the hemisphere 24 and bursting or creating hairline cracks in the latter. The probe tip 41 can be screwed into the blind threaded bore 22 till the bottom side 42 touches front surface 17. Therefore, the lines of force can flow over without being attenuated. In addition, in the attached state, the flanks of the threads abut against each other with considerable pressure, so that here also two large surfaces abut against one another without air gap and the lines of force can flow over without attenuation.

One need not necessarily use a hemisphere 24. Anyhow, in the diameter area, the surface values of the ground surface 26 change only slightly. The little cone 31 must be so small that only a small volume of hemisphere 24 reaches fusion temperature and the other part, because of its relatively large surfaces, remains sufficiently cool.

According to FIG. 5, a cap 43 made of titanium carbide is placed on the hemisphere 24. Within spherical angle 44 of about 60°, the cap 43 is in a range of approximately 3 – 15 $\mu$, preferably 4 to 6 $\mu$ thick and within this area, the deviation of the layer thickness from the mean value is smaller than 1 $\mu$. As is evident from FIG. 5, outside solid angle 44 the layer thickness gradually decreases. However, this does not matter, since the user persons place the sensor probe only in such a way that the layer to be measured touches the cap 43 inside solid angle 44.

Such a cap 43 cannot be attached with the plasma method. This would result in a high layer thickness at the location where the plasma beam hits the hemisphere 24 at right angles, but to the side the layer would become thinner. Also, the cap 43 cannot be attached by means of electrography, because really coherent layer areas cannot be produced by this method.

However, by gaseous diffusion it is possible to attach such a cap 43 in an economical fashion. The cap is bonded with the metal of the hemisphere 24 solidly and indissolubly. By means of an enlarged picture of the ground surface it is easily evident that the titanium carbide was attached by gaseous diffusion.

According to the invention, the carbides to be used cannot be dissociated by water or by thinned acids. Rather, they are resistant to thinned lyes and salt solutions.

What is claimed is:

1. A sensor probe for measuring the thickness of thin, non-ferromagnetic layers on a ferromagnetic base, including a magnet with at least partially spherical sector-shaped pole pieces having a layer made of a hard wear-proof material on that side of the pole pieces which is exposed to wear,
   said magnet having a soft iron yoke, with matching front faces,
   said pole pieces each comprising a ground ball bearing ball fastened to each of the front faces of said magnet yoke by electric spot welding,
   said layer being made of a carbide which cannot be dissociated by water or thinned acids and being deposited by gaseous diffusion in a certain spherical angle on the surface of said ball bearing and with a thickness in the range of approximately $3-6\mu$.

2. Sensor probe according to claim 1, in which a small cone is located on the front face of the iron yoke, to be welded to the ball bearing ball.

3. Sensor probe according to claim 1, in which the carbide is titanium carbide.

4. Sensor probe according to claim 3, in which the spherical angle is approximately 60°.

5. Sensor probe according to claim 3, in which the spherical sector has the approximate shape of a hemisphere.

* * * * *